UNITED STATES PATENT OFFICE.

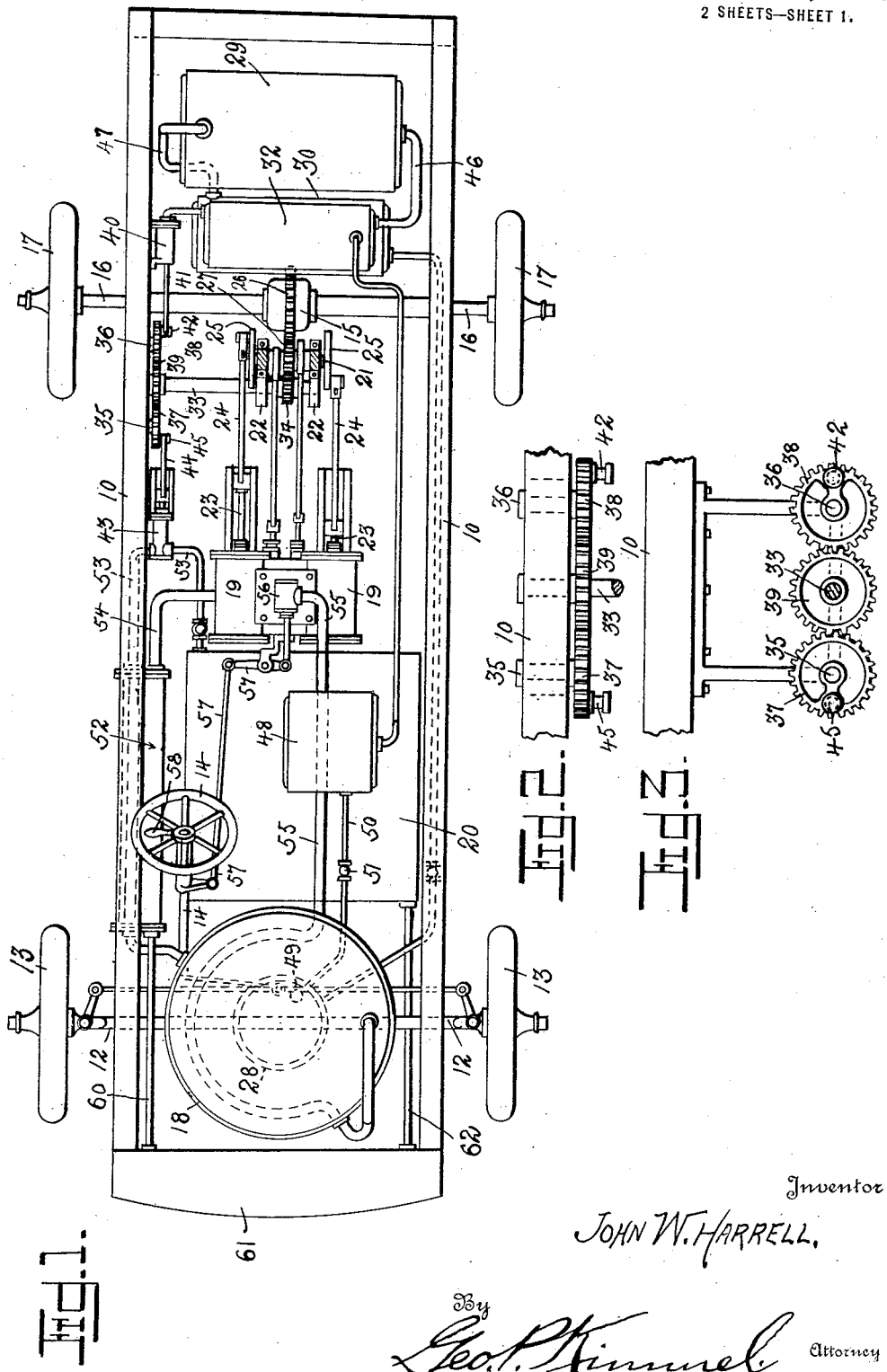

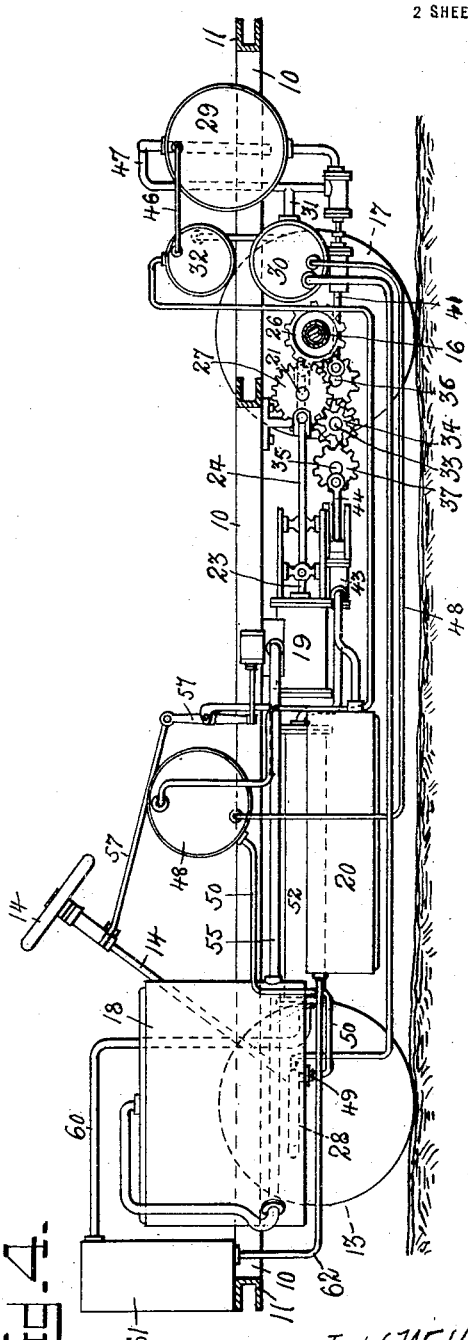

JOHN W. HARRELL, OF CINCINNATI, OHIO.

FUEL-FEEDING SYSTEM FOR STEAM MOTOR VEHICLES.

1,410,101. Specification of Letters Patent. Patented Mar. 21, 1922.

Application filed September 23, 1920. Serial No. 412,219.

*To all whom it may concern:*

Be it known that I, JOHN W. HARRELL, a citizen of the United States, residing at Cincinnati, in the county of Hamilton and State of Ohio, have invented certain new and useful Improvements in a Fuel-Feeding System for Steam Motor Vehicles, of which the following is a specification.

This invention relates to steam propelled vehicles of the automobile class, and has for one of its objects to simplify and improve the construction, and produce an apparatus of this class wherein the numerous clutch operating and shifting levers are dispensed with, and wherein a single throttle lever only is employed.

With these and other objects in view, the invention consists in certain novel features of construction as hereinafter shown and described and then specifically pointed out in the claim, and in the drawings illustrative of the preferred embodiment of the invention.

Figure 1 is a plan view of the running gear and chassis portion of an auto vehicle embodying the improvements, Fig. 2 is a plan view, enlarged of a portion of the pump transmission devices.

Fig. 3 is a front elevation of the parts shown in Fig. 2.

Fig. 4 is a side elevation with the frame in section on the line 4—4 of Fig. 1.

The improvements may be applied to many forms of auto vehicles, and it is not desired to limit the invention in any manner in this respect, but for the purpose of illustration is shown applied to a conventional arrangement of the chassis and running gear of a vehicle of this class, and includes the side rails or members 10, the transverse end members 11, the forward axle 12 with its carrier wheels 13, the steering wheel and rod 14, the differential gear casing 15, sectional axle 16, and rear carrier wheels 17.

A generator 18, preferably of the corrugated tubular class, is supported by the frame near the forward end, while the engines, preferably of the twin class, and indicated at 19, are supported from the frame intermediate its ends. A tank or reservoir 20 for the water supply for the generator is supported from the frame members 10.

A drive shaft 21 is supported by intermediate standards 22, and is connected to be rotated by the piston rods 23 of the engine through the medium of connecting rods 24 and face plates 25.

The differential gear includes a central gear wheel 26 which engages with a companion gear 27 on the shaft 21. By this arrangement the differential gear and the two part rear axle will be rotated by the alternate movements of the piston rods.

Located beneath the steam generator 18 is a liquid fuel burner of approved construction and represented as a whole at 28.

Supported by the frame members 10 at the rear is a liquid fuel storage tank 29, and supported adjacent the fuel tank is a small supply tank 30 connected at 31 to the storage tank, and likewise supported adjacent the tanks 29 and 30 is a drum 32 for compressed air. A counter shaft 33 is connected to a hanger 33′ suspended from one of the frame members 10 as shown in Fig. 3 and also to the standards 22, and mounted to rotate with the shaft 33 is a small gear 34 engaging the gear 27. Mounted on stub shafts 35 and 36 at opposite sides of the shaft 33 are pinions 37 and 38 engaging with a gear 39 on the shaft 33, the stub shafts being supported from the adjacent frame member 10.

An air pump 40 is coupled to furnish air to the air tank 32, the piston of the air pump being operative by a rod 41 connected to a crank pin 42 on the pinion 38.

Another pump 43 for supplying water to the reservoir 20 for the steam generator is attached to the same frame member 10, the piston of the pump 43 being operative by a rod 44 connected to a crank pin 45 on the pinion 37.

An air conductor pipe 46 connects the drum 32 with the storage tank 29 above the fuel therein, while a pipe 47 connects the tanks 29 and 30.

Suitably supported from the frame members 10 is a small tank 48 for supplying a pilot burner, indicated at 49, the latter being connected to the reservoir 48 by a pipe 50 having a controlling valve 51. The pilot reservoir is supplied by a pipe 48 from the tank 30.

A heater shell 52 is supported from the frame members 10 and through which the supply pipe 53 for the generator 18 leads through the pump 43. The exhaust from the engines passes into the shell 52 through a pipe 54, where the heat radiating therefrom heats the water passing through the feed pipe 53 on its way to the generator. The surplus exhaust steam then passes to a radiator device represented conventionally at 61 through a pipe 60 where it is condensed and the water of condensation returned to the tank 20 by a return-pipe 62.

The steam from the generator is condulted to the engines by a pipe 55.

The throttle valve for controlling the supply to the engines is inclosed in a casing 56 and operative through a system of rods and levers 57 by a small manually operative lever 58 carried by the steering wheel, as shown.

The improved apapratus is simple and compact with the parts easily accessible for renewal or repairs.

The preferred embodiment of the invention is disclosed in the drawings and set forth in the specification, but it will be understood that any modifications within the scope of the claims may be made in the construction without departing from the principle of the invention or sacrificing any of its advantages.

I claim:

In an apparatus of the class described, a steam generator, a motor operative by the steam from said generator, a liquid fuel burner for said generator, a storage tank for liquid fuel, a supply tank connected to be charged from said storage tank, a pilot burner associated with said fuel burner, a tank from which said pilot burner is supplied, conductor means for feeding the liquid fuel burner from said supply tank, means for feeding the tank for the fuel for the pilot burner from said supply tank, a drum for compressed air, conductor means between the drum and the storage tank above the fuel therein, conductor means between the drum and the supply tank above the fuel therein, conductor means between the supply tank and the tank for the pilot burner fuel, and means operative by the motor for compressing the air in the drum.

In testimony whereof, I affix my signature hereto.

JOHN W. HARRELL.